Nov. 4, 1969  S. J. JUSYK  3,476,140

FLUID TANK SHUT-OFF VALVE AND ACTUATION SYSTEM

Filed April 3, 1967  6 Sheets-Sheet 1

INVENTOR
STANLEY J. JUSYK
BY Vernon F. Hauschild
ATTORNEY

Nov. 4, 1969  S. J. JUSYK  3,476,140
FLUID TANK SHUT-OFF VALVE AND ACTUATION SYSTEM
Filed April 3, 1967  6 Sheets—Sheet 6

United States Patent Office 3,476,140
Patented Nov. 4, 1969

3,476,140
FLUID TANK SHUT-OFF VALVE AND ACTUATION SYSTEM
Stanley J. Jusyk, Southport, Conn., assignor to United Aircraft Corporation, East Hartford, Conn., a corporation of Delaware
Filed Apr. 3, 1967, Ser. No. 628,013
Int. Cl. B67d *3/00, 5/04, 5/34*
U.S. Cl. 137—392      24 Claims

ABSTRACT OF THE DISCLOSURE

A conduit or chamber through which tank air is discharged during the fluid tank filling operation and including a bypass sampling line connected to the air discharge conduit or chamber shaped to define a minimum velocity, laminar discharge airflow area therewithin and including temperautre sensitive thermistors located in the low velocity flow region of the bypass sampling line and actuatable to shut off a valve in the fluid intake line to the fluid tank when the tank is filled and the initial overflow fluid contacts the thermistors.

---

The invention herein described was made in the course of or under a contract or subcontract thereunder with the Department of the Navy.

BACKGROUND OF THE INVENTION

This invention relates to shut-off valves in the inlet lines to liquid tanks which include air discharge conduits extending therefrom and more particularly to a tank-full sensor comprising a bypass sampling conduit communicating with the air discharge conduit and shaped to define a low velocity, laminar flow area therewithin to receive temperature sensitive thermistors to shut off flow to the tank when the tank is full.

In the prior art, thermistors have been used in air discharge conduits during tank filling operations; however, in applications such as pressure refueling of fuel tanks in an aircraft in flight where the fuel enters the tank at a very rapid rate, air is driven from the tank at such a rapid rate that the temperature sensitive thermistor reacts to the cooling effect of the high volume of air passed thereover to shut off fuel flow to the tank before the tank is full.

The shut off system taught herein prevents this premature fluid shut off and yet shuts off the fluid flow at precisely the tanks full level. This system also allows the usage of thermistors as a device for fluid shutoff systems at varying fluid flow rates up to 300 g.p.m. This system also prevents the thermistor plenum chamber from becoming airbound so as to prevent the wetting of the thermistors at the precise condition of tank full level. Also, this system does not necessitate baffling of the thermistors, to thereby reduce the sensitivity thereof to cause tank overfilling and attendant system over-pressurization.

SUMMARY OF INVENTION

A primary object of the present invention is to provide an improved shut off system at the inlet to a fluid tank.

In accordance with the present invention, an air discharge conduit or chamber is connected to the tank to permit tank air to be discharged therethrough during the tank fluid filling operation and a bypass sampling line is connected to the discharge conduit and shaped to define a low-velocity, laminar flow region therewithin in which temperature sensitive thermistors are embedded to be wetted by the initial fluid overflow when the tank is filled to thereby shut off flow to the tank.

It is a further object of this invention to place these temperature sensitive thermistors in a plenum chamber in the bypass sampling conduit at the low-velocity, laminar flow region and to position the bypass sampling line at an angle to the horizontal so as to permit gravity drainage of liquid therefrom, and further to place the thermistors at the vertical top or sides of the plenum chamber so that the thermistors will be gravity drained of liquid.

It is still a further object of this invention to contour the bypass sampling line chamber so that the Reynolds Number at the thermistor is below about 2000 so that laminar flow occurs.

It is still a further object of this invention to teach such a shut off valve actuation system wherein the bypass sampling conduit is of circular cross section and wherein the ratio of the diameter of the inner wall at the outlet of the conduit to the diameter of the inner wall of the bypass sampling conduit inlet is at least 2.5, and wherein means are provided to establish a pressure drop across the bypass sampling conduit to establish fluid flow therethrough, but which pressure drop is less than the pressure drop across the air discharge conduit.

It is another object of this invention to sample airflow as well as fuel flow from the discharge vent of a fluid tank being filled at varying rates of flow.

It is a further object of this invention to keep the "tank full" thermistor sensing units out of the main air stream of the fluid tank venting system.

It is a further object of this invention to sense a full fluid tank condition by means of a thermistor unit, in a fluid tank, which fluid enters at varying rates of flow without premature or delayed shut off of the system, and which is particularly well suited for instantaneous tank shut off in high pressure, high mass flow fluid systems where delayed shut off would cause tank and conduit rupture.

It is a further object of this invention to permit purging the thermistor plenum chamber of accumulated fluid by reversing the airflow process.

DESCRIPTION OF THE PREFERRED EMBODIMENT

The invention will now be described in particularity by describing the drawings in detail.

Figures 1, 5:
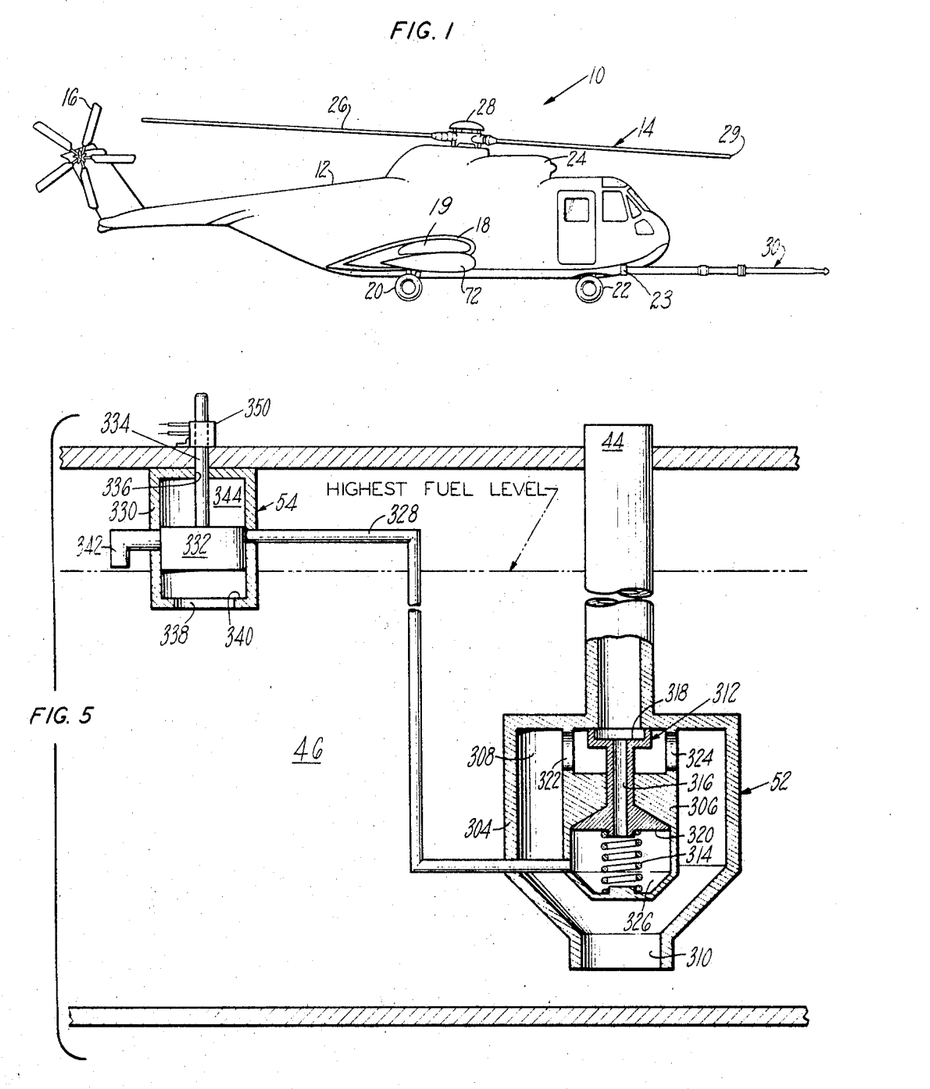
FIG. 1 is a showing of a modern helicopter utilizing this invention.
FIG. 5 is a showing partially in cross section, of the shut off valve and the high-level sensor used in the main fuel tanks of this fuel system.

Referring to FIG. 1 we see modern helicopter 10 which includes fuselage 12 supporting lift rotor 14 for rotation and which also includes anti-torque tail rotor 16. Sponsons such as 18 project laterally from opposite sides of the helicopter fuselage 12. The fuselage is supported above the ground by landing gear 20 and 22 which are preferably of the tricycle type. One or more jet-type engines 24 which consist of an air compressor section, a burner section and a turbine section in conventional fashion is mounted in fuselage 12 and provides the power to drive rotor 14. Lift rotor 14 includes at least two blades such as 26 which rotate about rotor head 28 to define a rotor disc having a periphery indicated at 29 and its forward end. Helicopter 10 may be of the type described in greater particularity in U.S. Patents Nos. 3,105,659, 3,097,701 or 3,080,927.

In-flight pressure refueling probe 30 is supported from fuselage 12 by one or more detachable clamps 23, and in a fashion to be described hereinafter, is actuatable between a retracted position and an extended position. In FIG. 1, the refueling probe is shown in its extended position and it is important that probe 30, when in its extended position, projects beyond the forward periphery 29 of the disc defined by the rotating rotor blades 26. The purpose of this is to insure that the apparatus which extends from the refueling plane and which engages in-flight refueling probe 30, such as a drogue, does not come in contact with the rotating blades 26 of the helicopter.

Figure 2:
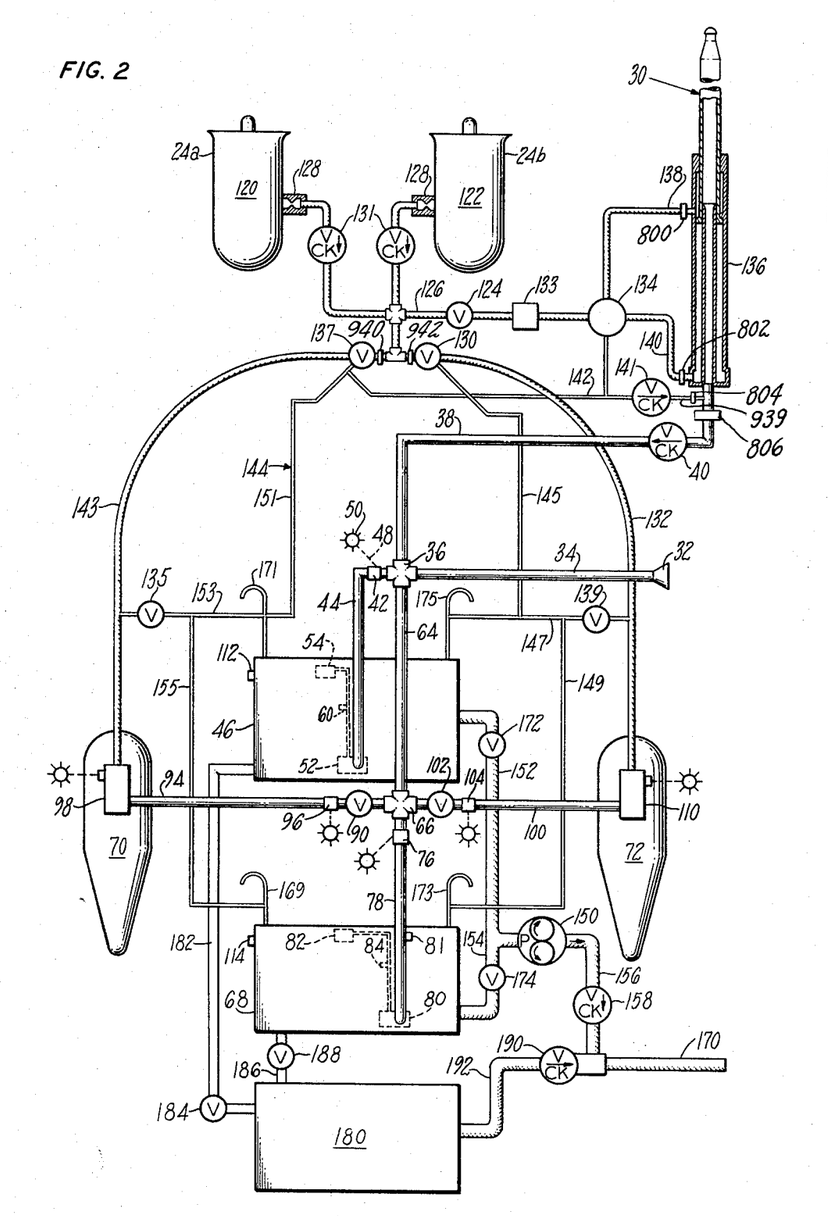
FIG. 2 is a schematic showing of the fuel storage and distribution system of such a helicopter.

Referring to FIG. 2 we see a schematic of the fuel system taught herein. It is important to note that this fuel system is capable of being refueled in three different fashions. First, the fuel system is capable of being refueled by pressure refueling on the ground, secondly, the system is capable of being refueled by gravity refueling on the ground and finally, the system is capable of being refueled by in-flight pressure refueling.

Ground pressure refueling

During ground pressure refueling, a pressurized fuel supply is provided either by some stationary ground installation or by a fuel truck and is connected to ground pressure refueling inlet or adapter 32. This pressurized fuel then flows through line 34 to cross connector 36. This pressurized fuel is prevented from flowing to in-flight probe 30 through line 38 by check valve 40. Check valve 40, and the other check valves referred to hereinafter, are of conventional type, for example, of the type shown in Perry's Chemical Engineer's Handbook, Fourth Edition, pages 6–38 and 6–39 published by McGraw-Hill, which permit flow through a given conduit in one direction only. From cross connector 36, this pressurized fuel may pass through flow sensor 42 and line 44 into the forward main fuel tank 46. Flow sensor 42 and the other flow sensors described hereinafter, may be of the type disclosed in Bulletin 1070 published by the Revere Corporation of America, Wallingford, Conn., and entitled "Flow Switches," and serve to provide a signal to the pilot when fuel is flowing therethrough. Each such flow sensor is connected to the pilot's compartment electrically through a conduit such as 48 and provides an indication such as illuminating electric light 50 in the pilot's compartment. In entering forward tank 46, the fuel passes through shut-off valve 52. High level sensor 54 serves to automatically actuate shut-off valve 52 when the fuel entering forward tank 46 reaches a preselected level. Also the pilot may manually actuate high level sensor 54 to actuate shut-off valve 52 at the time and level selected by the pilot. The operation of shut-off valve 52 and the high level selector 54 will be described in greater particularity hereinafter. Surge relief valve 60 is positioned between the shut-off valve 52 and the high level selector 54 and serve the function of preventing damaging pressure build-up in the fluid system. This pressure build-up is caused by both fuel pressure and fuel momentum in the high mass flow system. Surge relief valve 60 and the other surge relief valves discussed herein may be of the type shown in U.S. Patent No. 2,396,233 and in the publication entitled "Circle Seal Valves," published by the Circle Seal Products Company, Inc., 2181 E. Foothill Blvd., Pasadena, Calif., and identified as 500 series relief valves therein. Continuing our consideration of the pressure refueling operation on the ground, the pressurized fuel from cross connector 36 may also flow through line 64 to cross connector 66, and may pass therefrom either into aft main fuel tank 68, port auxiliary fuel tank 70 or starboard auxiliary fuel tank 72.

The pressurized fuel passing from cross connector 66 to the aft fuel tank 68 passes through flow sensor 76 in line 78 and eventually through shut-off valve 80 and thence into aft tank 68. Conduit 78 has surge relief valve 81 therein for the purpose of preventing part rupturing pressure buildup therein. High level sensor 82 in aft tank 68 serves the same function as its counterpart 54 in forward tank 46. That is, to actuate shut-off valve 80 when the fuel entering aft tank 68 reaches a preselected level. Surge relief valve 84 in aft tank 68 serves the same function as its counterpart 60 in the forward main fuel tank 46.

Fuel from cross connector 66 may flow into port auxiliary tank 70 when pilot actuated motor operated gate valve 90 is open in conduit 94. Pilot operated gate valve 90 may be of the type described more fully in the publication of the General Controls Company, 801 Allen Avenue, Glendale, Calif., and entitled "Fuel Hydraulic and Pneumatic Fluid Controls for Aircraft Missiles and Ground Support."

Flow sensor 96 is also located in conduit 94 to advise the pilot when fuel flow is occurring through conduit 94. Pressurized fuel from conduit 94 enters port auxiliary tank 70 through drop valve assembly 98.

Pressurized fuel from cross connector 66 may also pass into starboard auxiliary tank 72 through conduit 100 when pilot operated gate valve 102, which is similar to pilot operated gate valve 90, is actuated. Conduit 100 also includes a flow sensor similar to flow sensor 42. This flow sensor is designated as 104. The pressurized fuel in conduit 100 enters starboard auxiliary tank 72 through drop valve assembly 110.

Ground gravity refueling

The main tanks 46 and 68 may be gravity refueled on the ground through ports 112 and 114. Ports 112 and 114 incorporate valves which serve as pressure relief valves for these main fuel tanks 46 and 68 during all types of refueling. Fill-port-relief valves 112 and 114 may be of the type shown in U.S. Patent No. 2,396,233.

In-flight pressure refueling

During in-flight refueling, refueling probe 30 must first be extended. Probe 30 is actuated by the compressed air from either or both of the compressor sections 120 and 122 of gas turbine engines 24a and 24b. While two such gas turbine engines are shown, it will be understood that the number of engines is immaterial. For purposes of a description we will stress the system as it relates to port engine 24a only. Gas turbine engines 24a and 24b may be of the type shown in U.S. Patents Nos. 2,711,631 and 2,747,367.

To extend the probe 30, the pilot first opens probe air gate valve 124 located in conduit 126. Air restrictor 128, which is of conventional venturi design, connects conduit 126 to compressor section 120 of gas turbine engine 24a. Check valve 131 insures one-way flow of air through conduit 126. Air restrictor 128 prevents excessive loss of compressor air if there should be a rupture in conduit 126 or in any of the other conduits to which conduit 126 attaches. The compressor section air passing through conduit 126 is filtered as it passes through filter 133 and eventually arrives at pilot operated selector valve 134, described later in connection with FIG. 3. Selector valve 134 serves two functions. It ports the engine compressor air to one side of the piston-cylinder actuator 136 of in-flight probe 30 through either line 138 or 140 and vents the opposite side of the cylinder-piston arrangement 136 to vent line 142, which is connected to the remainder of the fuel vent system 144. The mechanism for extending and retracting probe 30 will be described in greater particularity hereinafter.

Vent system 144 includes lines 939, 142, 145, 147, 149, 151, 153, 171, 169, 175, 173 and 155 and vents all fuel tanks. Valves 135, 139, 130 and 137 permit selective tank venting.

With in-flight pressure refueling probe 30 so extended, and with the probe attached to the appropriate mechanism, such as a drogue, from the refueling aircraft, fuel under high pressure enters through probe 30, past check valve 40 and through conduit 38 to cross connector 36. From cross connector 36 the pressurized fuel may flow to either the forward tank 46, the aft tank 68, the port auxiliary tank 70, the starboard auxiliary tank 72 precisely in the same fashion as described above in connection with the ground pressurized fueling system.

Fuel transfer between tanks

In this fuel system, fuel may be transferred between auxiliary tanks and from either auxiliary tank to either main tank.

Fuel may be transferred from the starboard auxiliary tank 72 to the port auxiliary tank 70 by opening the pilot operated gate valves 90 and 102 and then opening gate valve 130 in pressure conduit 132 and by also opening vent valve 135 in vent system 144. At the same time, vent valve 139 is kept closed and gate valve 137 in pressure line 143 is also kept closed. With these valves so positioned, pressurized air from the compressor section 120 of jet type engine 24a, which is prevented from passing into conduit 126 by the closed condition of valve 124, flows through gate valve 130 and conduit 132 into starboard auxiliary tank 72 to force its fuel therefrom through drop valve assembly 110 for transmission through conduits 100 and 94 into port auxiliary tank 70. It will therefore be seen that by the use of pressurized air from the compressor section 120 of turbine-type engine 24a, fuel may be pumped from the starboard auxiliary tank 72 into the port auxiliary tank 70.

In like fashion, by closing valves 130 and 135 and opening valves 139 and 137, the pressurized air from engine 24a may be used to pump the fuel from the port auxiliary tank 70 to the starboard auxiliary tank 72.

With the valves positioned as just described, it is also possible to use compressor air to force the fuel from the port auxiliary tank 70 into either of the main tanks 46 or 68. This is done when gate valve 90 is open but gate valve 102 is closed so as to prevent flow of this fuel into the starboard auxiliary tank 72. With the valves so positioned, the fuel from port auxiliary tank 70 will flow into both forward main tank 46 and aft main tank 68 through their respective shut-off valves 52 and 80 as previously described in connection with the ground pressure refueling. If it is desired to transfer the fuel from the port auxiliary tank 70 to the forward main tank 46 only, this may be accomplished by pilot actuation of the high-level sensor 82 of aft tank 68 so that the tank shut-off valve 80 will close and accordingly all fuel passing from the port auxiliary tank 70 will pass into forward tank 46 only. Conversely, with the shut-off valve 52 of the forward main tank 46 closed and the shut-off valve 80 of the aft main tank 68 open, the fuel from the port auxiliary tank will flow to the aft tank 68 only.

By proper valve positioning it is also possible to use the compressor air from engine 24a to transfer the fuel from starboard auxiliary tank 72 to either the forward main tank 46 or the aft main tank 68. For example, with valves 90, 139 and 137 closed and with valves 130 and 102 and 135 open, compressor air from engine 24a will force the fuel from the starboard auxiliary tank 72 through conduit 100 and then through conduits 64 and 78 to forward tank 46 and aft tank 68. Again, if it is desired for the fuel from the starboard auxiliary tank 72 to go to one of the main tanks only, the pilot may actuate the high level sensor of the other main tank so as to close the shut-off valve thereof.

While substantial air pressure is necessary to actuate in-flight pressure refueling probe 30, this substantial amount of air pressure is not necessary to cause fuel to transfer from the auxiliary tanks and may well damage the tanks or system. It is therefor desirable to regulate the pressure of the air being passed from the engines through conduits 132 and 143 to the auxiliary tanks 70 and 72. Accordingly, pressure regulators 940 and 942 are placed in conduits 143 and 132, respectively. Pressure regulators 940 and 942 serve to regulate the pressure of the air being passed from the engines 24a and 24b to the auxiliary tanks 70 and 72 to prevent tank rupture. These pressure regulators may be of any variety, for example, of the type shown in Perry's "Chemical Engineers Handbook," Second Edition, published by McGraw-Hill, and illustrated on pages 2032 through 2035 thereof. It would also be possible to substitute and integral unit for each of valve 130 and pressure regulator 942, and valve 137 and pressure regulator 940 by using a valve-pressure regulator combination mechanism of the type described in the publication of the Janitrol Aircraft Division of Midland-Ross Corporation, 4200 Surface Road, Columbus 4, Ohio, entitled "Valve Control Assembly—Air Pressure," and identified as "Data Sheet JA–128."

Rapid fuel dumping

With this fuel system, it is possible to dump fuel from either of the auxiliary tanks 70 and 72 or the main tanks 46 and 68 overboard rapidly. This can be accomplished by forcing the fuel from the auxiliary tank into either of the main tanks by the use of compressor air in fashion described above and then utilizing rapid dumping fuel pump 150 which is of the type more fully described in Perry's "Chemical Engineers Handbook," Second Edition, published by McGraw-Hill, pages 2245–2270, to pump the fuel from the main tanks 46 and 68 through conduits 152 and 154, respectively, and then through conduit 156, with check valve 158 therein, overboard through overboard line 170. Pilot operated gate valves 172 and 174 are located in conduits 152 and 154, respectively, and serve to connect either forward main tank 46 or aft main tank 68 or both such tanks with pump 150. If the fuel in aft tank 68 only is to be pumped overboard, valve 172 is closed while valve 174 is opened and the action of pump 150 will serve to pump the fuel from tank 68 only overboard. Conversely, if the fuel from forward tank 46 only is to be pumped overboard, valve 172 is open and valve 174 is closed. It is also possible to pump the fuel from both tanks 46 and 68 overboard rapidly by opening both valves 172 and 174. In addition, by forcing the fuel from either port auxiliary tank 70 or starboard auxiliary tank 72 into one or both of the main tanks 46 and 68, the fuel from the auxiliary tanks may also be pumped overboard rapidly from the main tanks by the action of pump 150.

Each of the main tanks 46 and 68 and the auxiliary tanks 70 and 72 are attached to the fuel system vent system 144. Vent line 169 and vent line 171 are connected to tank 68 and 46, respectively. Vent lines 173 and 175 also extend from these main tanks 68 and 46. Vent valve 135 can be actuated to connect the port auxiliary tank 70 to either vent line 169 or 171 while the vent valve 139 can be pilot actuated to connect the starboard auxiliary tank 72 to either the vent line 173 or 175.

Still referring to FIG. 2 we see interior auxiliary tank 180 which is mounted in fuselage 12 to be higher than either forward tank 46, aft tank 68 and overboard dump line 170 so that the fuel from this tank may be gravity transferred to either the forward tank 46 through conduit 182 when pilot operated gate valve 184 is open or to aft tank 68 through conduit 186 when pilot operated gate valve 188 is open. Additionally, when pilot operated gate valve 190 is open, the fuel from interior auxiliary tank 180 may be gravity drained overboard through conduit 192 which connects to overboard drain line 170.

As best shown in FIG. 2, it will be noted that probe 30 and its actuating system 136 are self-contained and may be quickly attached or detached from the fuselage because of probe clamps 23 and quick attach-detach couplings 800, 802, 804 and 806 in airlines 138, 140 and 139 and in fuel conduit 38. These couplings may be of the type described in Perry's "Chemical Engineers Handbook," Second Edition, published by McGraw-Hill, page 925.

Figure 3:
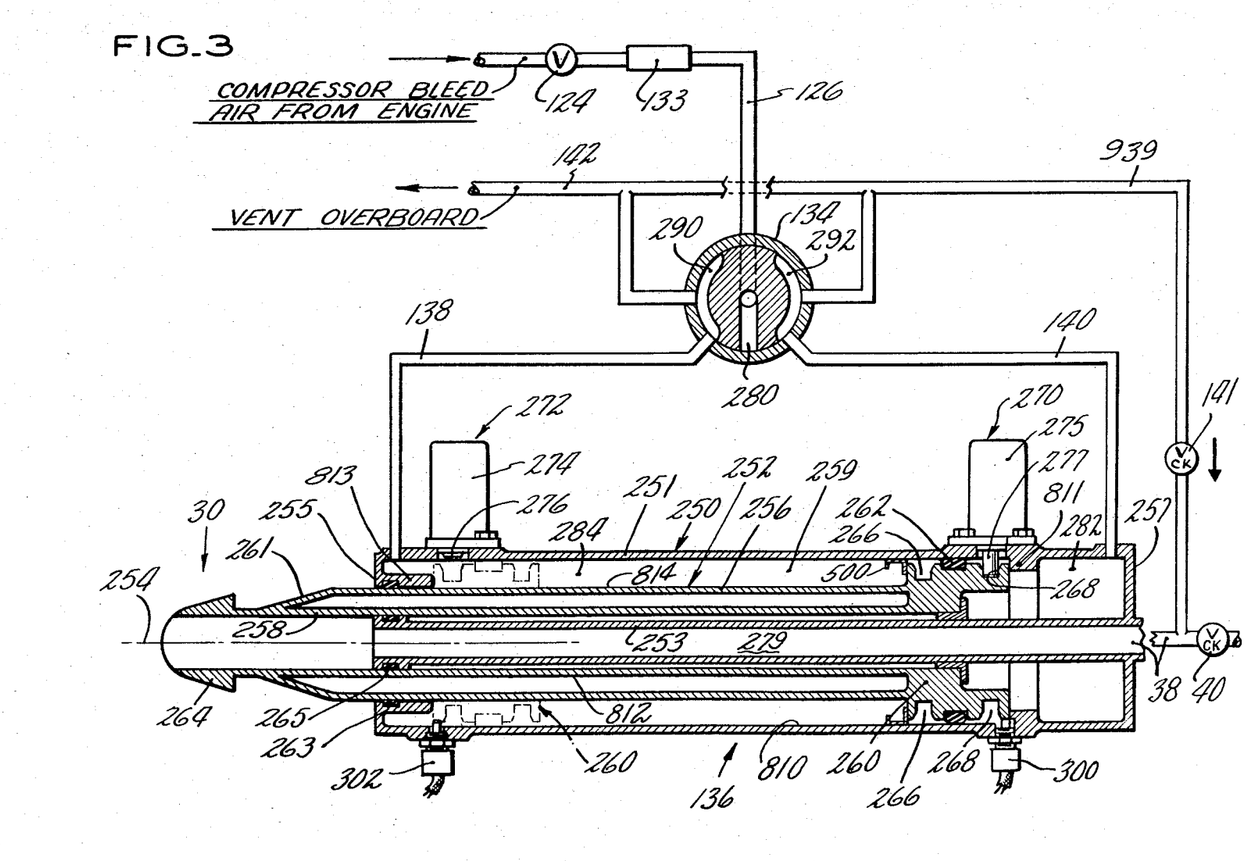
FIG. 3 is a cross-sectional showing of the in-flight refueling probe, its actuator and its actuator control system.

Referring to FIG. 3 we see my extensible-retractable in-flight pressure refueling probe 30 in greater particularity. The probe actuating mechanism 136, which is of circular cross section and concentric about axis 254, consists of a stationary cylinder assembly 250 within which movable piston-probe mechanism 252 can reciprocate. Cylinder assembly 250 includes outer cylinder 251 and inner cylinder 253 which are sealably joined by end plates 255 and 257 to define annular chamber 259 therewithin. Both cylinder assembly 250 and piston-probe mechanism 252 are preferably of circular cross section and concentric about axis 254 and made of aluminum for the purpose of obtaining maximum weight-to-strength ratio. While the double-walled cylinder provides a rugged construction and the necessity for fuel conduit 253 lends itself to this construction, it will be recognized that outer cylinder 251 and piston-probe 252 define pressure chambers 282 and 284. Piston-probe mechanism 252 consists of outer cylinder member 256 and inner cylinder member 258 joined thereto by piston 260 and member 261 for strength purposes. Piston member or skirt mechanism 260 extends radially outwardly from cylindrical members 256 and 258 and coacts with the inner surface of cylinder assembly 250, through the cooperation of circumferential seal 262, to form a cylinder-piston arrangement therewith and define pressure chambers 282 and 284 therewithin on opposite sides of piston 260. Circumferential seals 263 and 265 extend and seal between cylinder assembly 250 and piston-probe assembly 252. As best shown in FIG. 3, the sliding surfaces such as surfaces 810, 812 and 814 between piston assembly 252 and cylinder assembly 250 are preferably hard anodized by a conventional hard anodizing process, for example, of the type described in U.S. Patent Nos. 2,692,851 and 2,692,852. Inner cylindrical member 258 extends forward beyond outer cylindrical member 256 and attaches to and supports probe tip 264. Members 258 and 253 cooperate to define probe fuel conduit 279 which connects to conduit 38. By viewing FIG. 3 it will be noted that the fuel which enters probe 30 passes both through the probe and its actuating system through internal conduit 279 defined by cylinder members 258 and 253, thereby avoiding the drag creating problems encountered with fuel conduits which extend external of the probe. Also, because these two conduits are always aligned with fuel conduit 38, it will be noted that probe 30 is ready for refueling when in any position between its retracted and extended positions. Forming an integral part of the cylinder assembly 250 are the retract abutment ring 811 and the extend abutment ring 813 which serve as stops to limit the throw of the piston-probe assembly 252 within the cylinder assembly 250. Elements 811 and 813 are shown as rings but could be radial pins which are retractable to permit piston removal. Probe-piston assembly 252 contains two axially spaced circumferential grooves 266 and 268 on opposite sides of seal 262, which cooperate with lock mechanisms 270 and 272 to lock probe-piston assembly 252 in its retracted position shown in solid lines in FIG. 3 and in its extended position shown in phantom in FIG. 3. Lock mechanisms 270 and 272 are identical and preferably comprise electric motor 275 and 274 which causes lock pin 277 and 276 to rotate or otherwise move radially inwardly to engage annular recesses 266 or 268 to lock the probe-cylinder mechanism 252 in either its extended or retracted positions. Lock pin 276 of motor 272 engages recess 266 for locking probe-piston assembly 252 in its extended position while lock pin 277 of motor 270 engages recess 268.

As best shown in FIG. 3, air from the compressor section 120 or 122 of one or more of the engines 24 passes through line 126 and then through open valve 124 and filter 133 to selector valve 134. This compressed air passes through conduit or port 280 in multi-positionable selector valve 134 and then either through conduit 138 or 140 to the opposite pressure chambers 282 and 284, on opposite sides of piston member 260 of probe-piston 252 to cause the probe to either extend or retract. It will be noted that selector valve 134 includes recesses 290 and 292, which serve to vent the side of probe-piston mechanism 252 which is not under pressure. As shown in FIG. 3, recesses 290 and 292 vent pressure chambers 282 and 284 when the selector valve 134 is in its neutral position, thereby removing the motive force of the compressed air from probe-piston assembly 252 and the attendant pressure variations which would otherwise be encountered therein as the altitude of the helicopter changed. In operation, selector valve 134 moves from the neutral position from which it is shown in FIG. 3 to a first position in which conduit 280 communicates with conduit 140 to provide compressor air into chamber 282 so as to propel probe-piston mechanism 252 to its extended position, during which selector valve position, recess 290 puts conduit 138 and hence chamber 284 into communication with vent conduit 142. Vent line 939 with check valve 141 therein connects fuel conduit 38 to vent line 142 to prevent a conduit collapsing vacuum from forming in line 38 between probe 30 and check valve 40 when the probe is being extended. When the refueling probe 30 is to be retracted, the selector valve 134 is rotated so that the converse occurs, namely, that compressed air is supplied to chamber 284 through the coaction of conduits 138 and 280 while chamber 282 is vented to the vent line 142 by the coaction of conduit 140 and recess 292. Check valve 141 performs the function of preventing fuel from conduit 38 from passing into the vent lines 939 and 142. Limit switches 300 and 302 are actuated by piston member 260 to provide a signal when the probe 30 is at the opposite ends of its travel so as to bring about certain operations in the sequencing of the probe now to be described.

Still referring to FIG. 3 it will be seen that in-flight pressure refueling probe 30 and its actuating system are electrically bonded to the fuselage 12 of aircraft 10 and the parts of probe 30 and actuator 136 are electrically bonded because probe-piston member 252 is electrically connected to outer cylinder 251 at all times by leaf spring member 500 and outer cylinder 251 is electrically connected to fuselage 12 through clamps 23. Spring member 500 attaches to member 252 and bears against the inner wall of outer cylinder 251 for all positions of member 252. This electrical bonding between the entire probe unit 30 and the helicopter 10 insures against electrical discharge between the refueling aircraft and the helicopter and the fire danger created thereby.

While our preferred embodiment uses a fixed cylinder 250 and movable piston 252, it is within the skill of the art to make piston 260 fixed and to move probe tip 264 with cylinder 250.

Sequence of operations for probe extension and retraction

Figure 4:
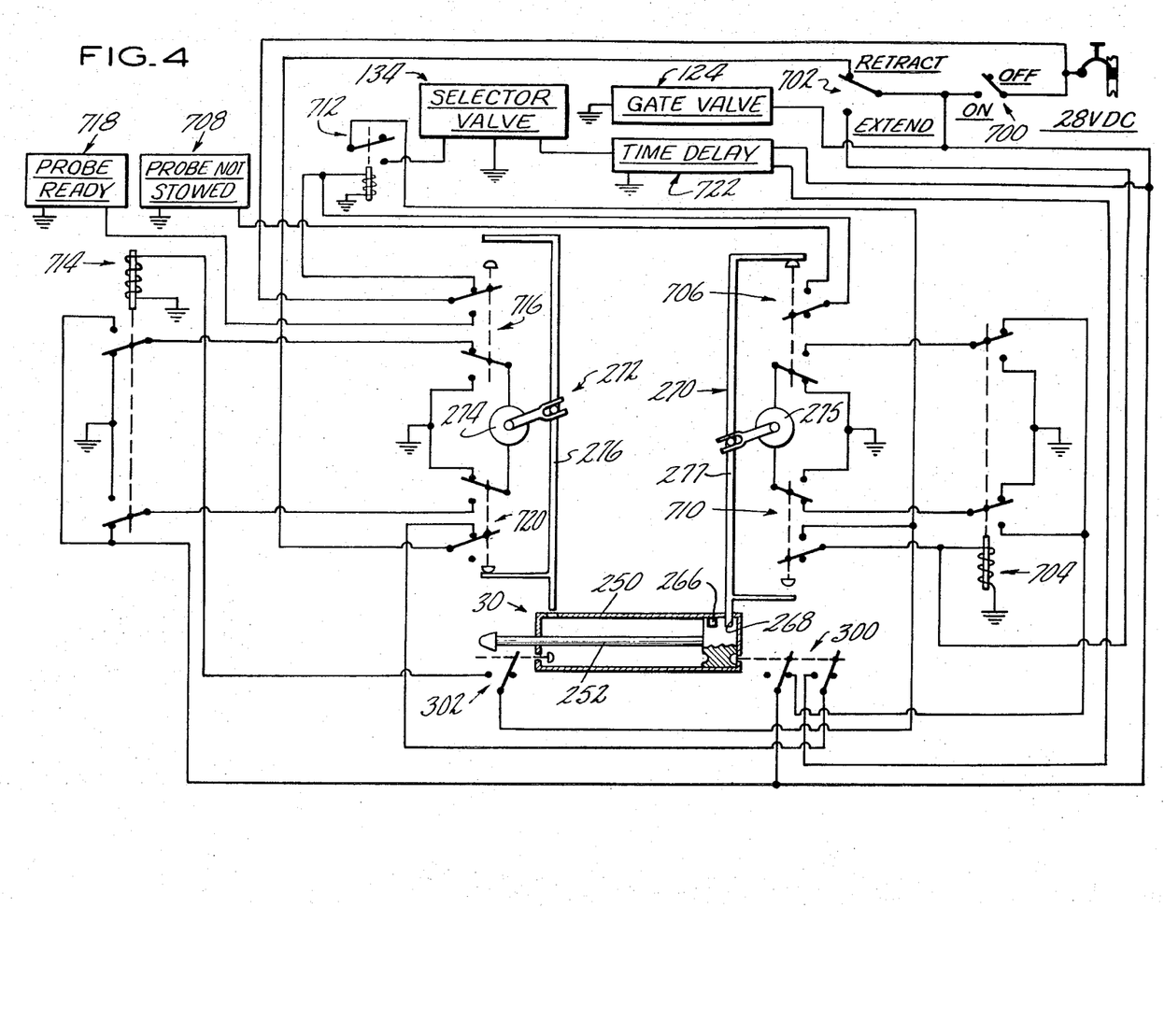
FIG. 4 is a schematic showing, including an electrical diagram of the in-flight probe actuation system and its automatic sequencing mechanism.

The sequence of operations of probe 30 is best described with respect to FIG. 4. For the purposes of explanation, the probe 30 and mechanical locks 270 and 272 are schematically superimposed on the electrical circuitry which controls the probe movements. It should be noted that all relays in FIG. 4 are shown in the deactivated state.

Assuming that the probe is retracted and locked, the following sequence takes place. When the pilot desires to execute a refueling mission, he must first turn on the master switch 700 to energize his selector switch 702, gate valve 124 for compressor bleed air and other appropriate circuitry from the 28 vdc power bus.

Extension of the probe

The pilot throws his selector switch 702 to the "Extend" position. Relay 704 is energized to establish the proper polarity across lock pin actuator 275 for retracting the lock pin 277. As the actuator 275 retracts the lock pin 277, microswitch 706 will be thrown immediately after the lock pin 277 begins to be withdrawn from the locking recess 268. As microswitch 706 is thrown, the probe-not-stowed light 708 is energized to indicate to the pilot that the refueling probe 30 is no longer locked. As the actuator 275 moves the lock pin 277 to its fully disengaged position, microswitch 710 will be thrown to shut off electrical power to the actuator 275 and to energize selector valve 134 through the contacts or relay 712. Relay 712 is activated by the 28 vdc power bus whenever the other lock pin 276 is withdrawn. The selector valve 134, being a three-position valve, will be moved from its deenergized neutral position to extend the probe by applying compressor air from the gate valve 124 to the extend chamber 282 and propel the piston assembly 252 toward the extended probe position. As the probe begins to extend, limit switch 300 will be thrown and electrical power for the actuator 275 will be completely removed from the contacts of relay 704.

The probe 30 will move to its extended position and limit switch 302 will be thrown by the piston assembly 252. Relay 714 will be actuated through the contacts of microswitch 710 and limit switch 302 to establish the proper polarity across lock pin actuator 274 for engaging lock pin 276 with the locking recess 266. The actuator 274 will drive lock pin 276 into the piston assembly 252 and as the lock pin 276 fully engages the recess 266, microswitch 716 will be thrown to deenergize the actuator 274, relay 712 and the probe-not-stowed light 708. When relay 712 is deenergized, selector valve 134 will assume its neutral position and shut off the bleed air to the piston assembly 252 while venting both chambers 282 and 284. At the same time, the contacts of microswitch 716 also energize the probe-ready light 718 to indicate to the pilot that the probe 30 is locked and prepared to engage the refueling drogue for fuel transfer.

Should mechanical lock 272 fail to lock, it will be noted that our system is fail safe because microswitch 716 will not be thrown to deenergize relay 712 and selector valve 134 and hence compressor bleed air from the selector valve 134 will hold the probe in its extended position until the selector switch 702 is thrown to its "Retract" position.

Retraction of the probe

When the pilot has taken on fuel and disengaged the probe from the refueling drogue, he retracts the probe by moving his selector switch 702 to the "Retract" position. Electrical power previously energizing relay 714 through microswitch 710 and limit switch 302 will immediately be lost and the contacts of relay 714 will reverse the polarity previously applied across actuator 274. Actuator 274 immediately withdraws lock pin 276 from the piston assembly 252. As lock pin 275 begins to move out of engagement with recess 266, microswitch 716 will be thrown to extinguish the probe-ready light 718 to energize the probe-not-stowed light 708. When the lock pin 276 is completely withdrawn, microswitch 720 will be thrown to deenergize actuator 274 and to energize selector valve 134 through the contacts of limit switch 300 and time delay relay 722. The time delay relay 722 is of the type which does not delay the input signal when the relay is pulled in but which produces an artificial signal for a short period of time after the actuating signal has been lost. Consequently, the selector valve 134 will be actuated as soon as the microswitch 720 is thrown and will remain actuated for a brief period after the signal to the time delay relay 722 is lost. The selector valve 134, when actuated by relay 722, moves from its neutral position to apply compressor air to the retract chamber 284 and propel the piston assembly 252 toward the retracted probe position. As the piston assembly 252 moves into the retracted probe position, limit switch 300 will be thrown to electrify the contacts of deactivated relay 704 and to terminate the signal to the time delay relay 722 for the selector valve 134. The time delay relay 722 holds the selector valve 134 open for additional period of approximately two seconds to insure that the piston assembly 252 remains in the retracted position while the actuator 275 moves lock pin 277 into engagement with the recess 268. When lock pin 277 is fully engaged with the recess 268, microswitch 706 is thrown to extinguish the probe-not-stowed light 708 and to deenergize the actuator 275.

It will be noted that the probe-not-stowed light takes electrical power directly from the 28 vdc power bus and that the light 708 will be energized whenever the probe 30 is not licked even though the master switch 702 is not on. The probe-not-stowed light 708 and the probe-ready light 718 provide the pilot with an indication of the probe condition at all times during the refueling operation and at any other time that the probe is not safely stowed and locked.

Referring to FIG. 5 we see a typical main fuel tank shut-off valve 52 and high-level sensor 54 in greater particularity. While the shut-off valve and the high level sensor of forward main fuel tank 46 will be described, it should be borne in mind that comparable mechanism is present in aft main fuel tank 68. Shut-off valve 52 consists of outer wall member 304 and inner wall member 306 which define annular chamber 308 therebetween, which annular chamber communicates with the interior of tank 46 through conduit 310. Double area piston 312 is biased by spring 314 to its closed position shown in FIG. 5. Piston 312 has center conduit 316 passing therethrough and has small area end 318 at one end thereof and large area end 320 at the opposite end thereof. As fuel enters shut-off valve 52 through conduit 44, the pressure of the fuel overcomes the force of spring 314 to force piston member 312 downwardly to permit passage thereby and through ports 322 and 324 into the interior of fuel tank 46. This fuel also passes through central conduit 316 and into chamber 326 from whence it flows through conduit 328 over to high level sensor member 54. High level sensor member 54 comprises hollow housing member 330 having float member 332 therewithin. Shaft member 334 projects from float member 332 and extends through aperture 336 in housing member 330. A second aperture 338 in the base of housing member 330 permits the fuel within chamber 46 to act against float member 332. When the fuel in fuel tank 46 is at a level lower than high level sensor 54, float member 332 rests against the base surface 340 of housing member 330 thereby placing conduit 328 into communication with conduit 342 through chamber 344. Conduit 342 is open so that any fuel passing therethrough dumps into the interior of fuel tank 46. As the level of the fuel in tank 46 gets higher, it eventually enters aperture 338 and acts upon float 332 to cause the float to move higher within chamber 344 until float 332 eventually blocks communcation between conduits 328 and 342. The float in this condition, the pressure in chamber 326 of the shut-off valve 52 builds up and, due to the difference in area between the ends 318 and 320 of piston 312, the piston, with the aid of spring 314, is forced to its closed position, thereby preventing the admission of further fuel into tank 46. It should be noted in FIG. 5 that a solenoid-type mechanism 350 coacts with shaft member 334 of the high level sensor 54 so that this pilot operated solenoid member 350 can be actuated to cause float member 332 to assume its blocking position, thereby shutting off shut-off valve 52 at the will of the pilot.

Figure 6:
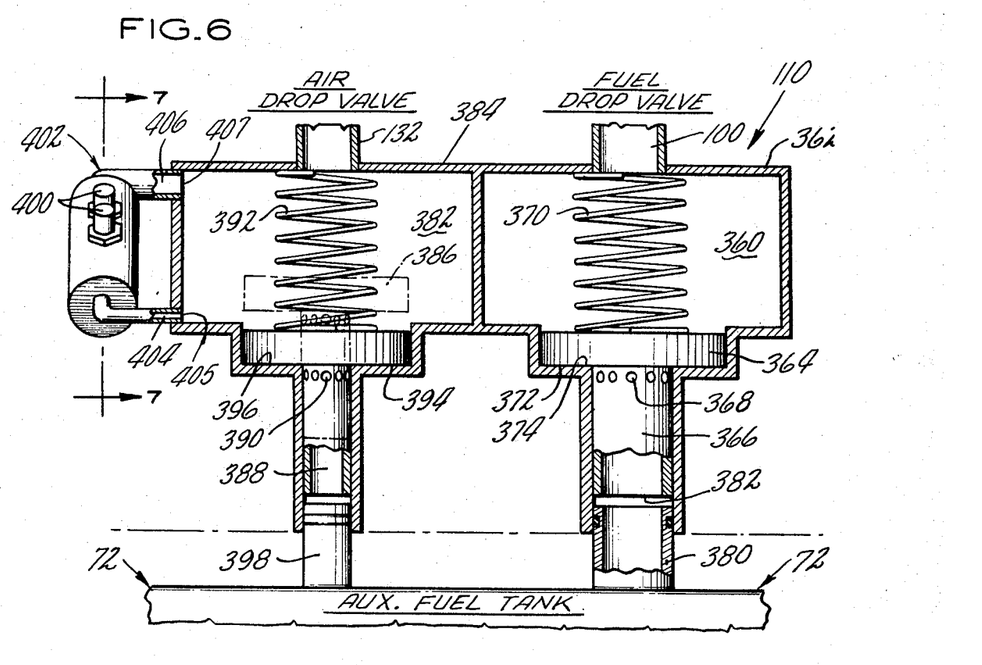
FIG. 6 is a showing, partially in cross section, of the air and fuel drop valve combination used with the jettisonable auxiliary fuel tanks in this fuel system.

Referring to FIG. 6 we see starboard drop-valve 110 of the starboard auxiliary fuel tank 72. While drop valve 110 will now be described, it should be borne in mind that the port auxiliary tank 70 has an identical drop valve 98. In viewing FIG. 6 it will be noted that fuel passes through fuel conduit 100 into chamber 360 defined by housing 362. Housing 362 also houses fuel valve 364 which includes a hollow stem member 366 having peripheral apertures 368 passing through the walls thereof so as to place the hollow stem member 366 of valve 364 into communication with chamber 360. Spring member 370 biases fuel valve 364 so that the undersurface 372 thereof bears against valve seat 374. As auxiliary fuel tank 72 is placed in position, standpipe 380, projecting therefrom and communicating with the interior thereof, bears against the bottom surface 382 of fuel valve 364 to force fuel valve 364, against the action of spring 370, to its open position so that any fuel which enters chamber 360 through conduit 100 may pass around valve 364 and through apertures 368 into the interior of the hollow stem portion 366 of valve 364 and thence into auxiliary fuel tank 72 through standpipe 380.

Still viewing FIG. 6 it will be noted that a similar arrangement is provided for air passage into and out of auxiliary tank 72 through conduit 132. Air from conduit 132 enters chamber 382 defined by housing 384, which housing also houses air valve 386, which is similar to fuel valve 364 just described, and which includes hollow stem member 388 with the peripheral apertures 390 extending through the walls thereof. Spring 392 serves to force air valve 386 to its closed position wherein its lower surface 394 contacts seat 396. Accordingly, any air which enters chamber 382 through conduit 132 may pass around air valve 386 whenever that air valve is lifted to its open position by the action of air standpipe 398 which extends from auxiliary fuel tank 72. After passing around valve 386, the air may pass through nozzle-like apertures 390 into hollow stem member 388 of the valve and then through standpipe 398 into the interior of auxiliary fuel tank 72. With air valve 386 in its open position, any air may also pass from the interior of auxiliary tank 72 through standpipe 398, hollow stem member 388, apertures 390, chamber 382 and be exhausted or vented through a conduit 132.

Accordingly, in operation, when fuel is being admitted to auxiliary fuel tank 72 through conduit 100 by either the ground pressure refueling system or the in-flight probe pressure refueling system, the fuel enters chambers 360, passes around valve 364 and through apertures 368 into the interior of hollow stem 366 and thence through standpipe 380 into auxiliary fuel tank 72. As fuel is being admitted into the auxiliary fuel tank 72, air must be discharged therefrom to permit unimpeded entry of the fuel and accordingly the displaced air is passed through standpipe 398, hollow valve stem member 388, apertures 390, chamber 382 and eventually conduit 132 to vent.

During transfer of fuel from auxiliary tank 72 to either of the main tank 46 or 68 or the auxiliary tank 70, compressed air from the engine compressor air sections 120 and 122 is forced through conduit 132 and into chamber 382 of the air valve section of drop valve 110 and thence into auxiliary tank 72 through apertures 390, hollow stem 388 and standpipe 398. This forced entry of regulated air pressure into the auxiliary tank 72 displaces the fuel therein and causes that fuel to be transferred from the tank as it passes through standpipe 380, hollow stem section 366, apertures 368, chamber 360 and conduit 100 to any of the other tanks just mentioned.

When fuel is being transferred from the auxiliary fuel tank 72, vent valve 139 (FIG. 2) is closed so that air pressure will not vent overboard and can be introduced through conduit 132 and the air drop-vent valve 110 into the tank 72. When fuel is being introduced to the auxiliary tank 72 through the fuel drop valve 110, valve 139 is opened to place the outlet of the air drop valve in communication with vent system 144.

It is an important feature of the drop valve 110 that when the tank 72 is jettisoned, no compressed air or fuel be wasted and therefor that air valve 386 and fuel valve 354 are shut off. This action is caused when the jettisoning of auxiliary tank 72 causes the removal of standpipes 380 and 398 to thereby permit springs 370 and 392 to force fuel shut-off and metering valve 364 and air shut off and metering valve 386 to their closed or shut-off positions.

Figure 7:
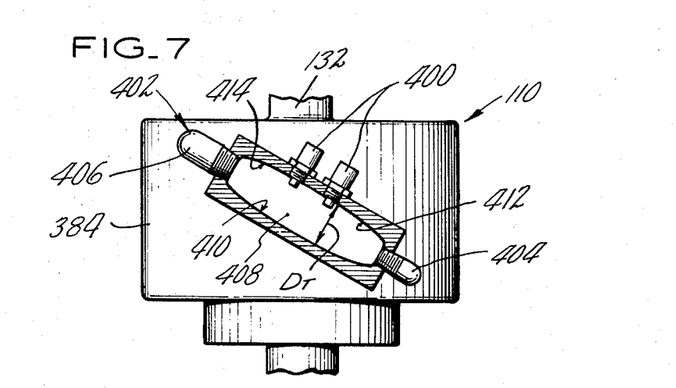
FIG. 7 is a view taken along line 7—7 of FIG. 6 to show the bypass line with its particular configuration and thermistor arrangement.

It is important during the filling operation of the auxiliary fuel tanks 72 that fuel flow to the tank be discontinued as soon as the tank is filled. This is accomplished by the use of thermistors 400 which are electrically connected to the gate valve 102 in conduit 100 (see FIG. 2). Thermistors 400 are temperature responsive and serve to shut off gate valve 102 and thereby prevent further flow of fuel to auxiliary tank 72 through conduit 100 when fuel comes into contact with the thermistors 400, thereby indicating that the auxiliary tank 72 is full. It is an important teaching of this construction that the thermistors not be located in chamber 382 of the air dump valve since it has been found that with the thermistors so located, the rapid flow of air from auxiliary tank 72 through chamber 382 during refueling causes the highly temperature sensitive thermistors 400 to actuate shut-off valve 102 to its closed position when, in fact, the auxiliary tank 72 is not filled. It is accordingly a teaching of this construction to place thermistors in a particularly designed bypass sampling line, which bypass sampling line 402 communicates at its opposite ends with air dump valve chamber 382. Bypass sampling line 402 is preferably extending at an angle to the vertical direction to permit gravity drainage of liquid therefrom and has at its lower end entrance conduit 404 which is of smaller cross-sectional area than outlet conduit 406. Each of conduits 404 and 406 communicate with plenum chamber 408. Plenum chamber 408 is of substantially large cross-sectional area than conduit 404 and is defined within walls 410 which, with respect to fluid flowing from 400 to 406, are smoothly divergent at section 412, and smoothly convergent at section 414 and smoothly blended therebetween. The purpose of this particular shape of bypass sampling conduit 402 is to cause a sample of the air being expelled from the auxiliary tank during refueling to pass by thermistors 400 at a low velocity and in smooth nonturbulent flow so as to have minimum effect upon the temperature sensitive thermistors 400. When, during refueling, auxiliary tank 72 is eventually filled, the initial overflow fuel therefrom will pass through apertures 390 of the air drop valve and a portion through bypass sampling passage 402. To insure fluid flow through bypass sampling passage 402, it is essential that there be a pressure drop between the inlet and outlet thereof. This pressure drop is caused by positioning inlet 405 of bypass sampling conduit 402 closer to the region of maximum dynamic pressure adjacent nozzle-type apertures 390 than the outlet 407 of conduit 402.

Accordingly, due to this pressure drop and the flow guiding contouring of the bottom of T-valve 386 with respect to housing 362 as shown in FIG. 6, initial overflow fuel from full auxiliary tank 72 passes through bypass sampling conduit 402 and when that fuel first contacts the thermistors 400, those thermistors, due to an electrical connection between thermistor 400 and shut-off valve 102 (FIG. 2) will rapidly close the shut-off or gate valve 102 so as to prevent the pumping of additional fuel to the auxiliary tank 72. There is a similar thermistor control in drop valve 98 of auxiliary tank 70 which shuts off valve 90 in conduit 94.

When regulated compressor air passes into auxiliary fuel tank 72 from conduit 132 through the air drop valve to transfer fuel from auxiliary tank 72, such compressed air will also pass through bypass conduit and clean any fuel deposited therein during refueling. It is also important that thermistors 400 are located at the top of plenum chamber 408 so that fuel will drain by gravity.

There are certain significant features of drop valve 110 and the thermistor system 402 illustrated in the preferred embodiment shown in FIGS. 6 and 7. Preferably, the area of conduit 132 is larger than the combined area of apertures 390 to insure unrestricted flow through chamber 382 of the air being forced out of auxiliary tank 72 during refueling. In addition, because the area of conduit 406 is larger than the area of conduit 404 and because of the nozzle pressurizing effect of the fluid (whether air, a mixture of air and fuel, or fuel) passing through apertures 390, the pressure at the inlet 405 to inlet conduit 404 is greater than the pressure at outlet 407 of conduit 406 thereby establishing the necessary pressure drop through bypass sampling conduit 402 to establish fluid flow therethrough. The areas of conduits 132 and the total areas of the apertures 390 must be selected so that the pressure drop thereacross is greater than the pressure drop across bypass sampling conduit 402. Also, the area of outlet 407 of conduit 406 must be selected so that it offers less restriction to flow than do apertures 390. This does not always mean that the area of conduit 406 is greater than the combined areas of apertures 390 because there is greater resistance to the fluid passing through the series of apertures 390 than there is to the fluid passing through the single enlarged conduit 406. It should be noted that while apertures 390 are illustrated as being of circular cross section, they could as well be one or more slots.

As previously described plenum chamber 408 (FIG. 7) performs the dual function of: (1) reducing the velocity of the fluid passing therethrough, (2) producing laminar fluid flow therethrough.

To insure laminar fluid flow through plenum chamber 408 we select the plenum chamber diameter at any point but particularly in the region of thermistors 400 ($D_t$) so that, based upon the velocity of the fluid passing through plenum chamber 408 at that diameter, a Reynolds number of about 2,000 or less is accomplished according to the following equation:

$$R_e = VD\rho/\mu$$

where:

$R_e$ = Reynolds number (dimensionless)
$\rho$ = density of the fluid
$V$ = velocity of the fluid
$D$ = the diameter of the conduit
and
$\mu$ = is the absolute viscosity of the fluid.

A consideration of Reynolds number gives some indication of flow conditions. With the Reynolds number at about 2,000 or below, laminar flow through plenum chamber 408 is achieved. With the Reynolds number above 2,300 turbulent flow occurs through the plenum chamber and with the Reynolds number therebetween, mixed flow occurs. It is recognized that there is some Reynolds number variations with variations in operating conditions.

Another advantage to be gained by the use of this specifically contoured plenum chamber 408 is fuel drainage. Actually, during refueling of fuel tank, not only air passes through bypass sampling line 402, but a mixture of air and fuel droplets or foam. The reduced velocity of this mixture as it flows through the plenum chamber causes the fuel to drop due to gravity to the bottom of plenum chamber 408 and drain therefrom by the force of gravity. It accordingly might be desirable to provide a removable drain plug (not shown) in the bottom of plenum chamber 408 to remove fuel so accumulated therefrom. This drain plug would be especially useful in installations where pressurized air is not reverse flowed through chamber 382 and bypass sampling line 402 for fuel transfer.

Figures 8, 9:
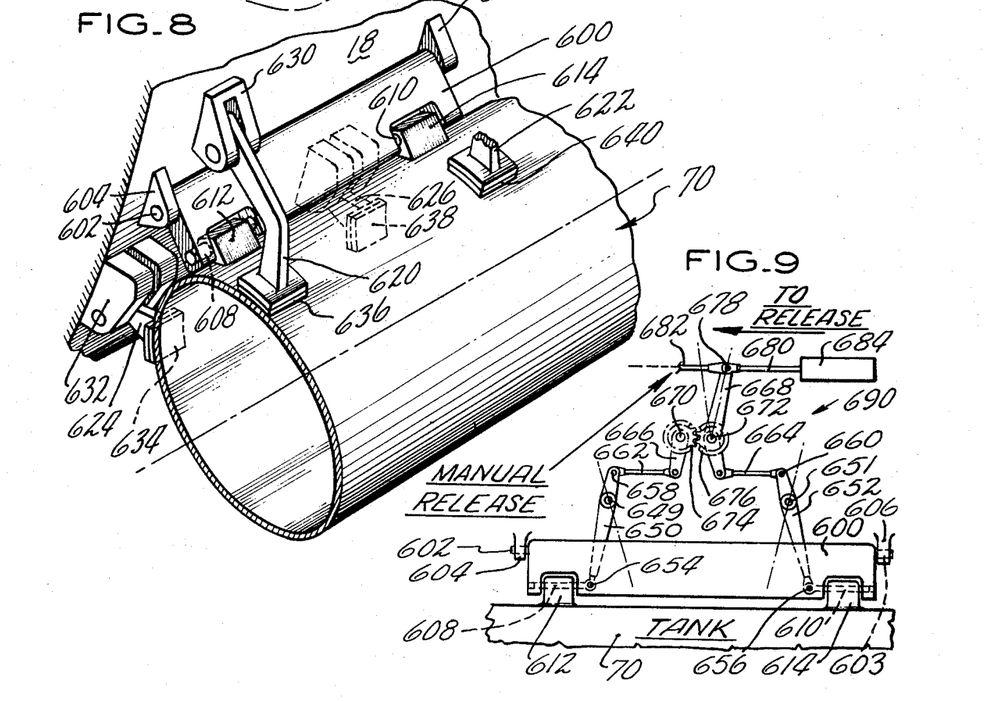
FIG. 8 shows the jettison attachment between the helicopter sponson and one of the auxiliary fuel tanks.
FIG. 9 illustrates the release mechanism which may be actuated by the pilot to jettison either of the auxiliary fuel tanks.
Figure 10:
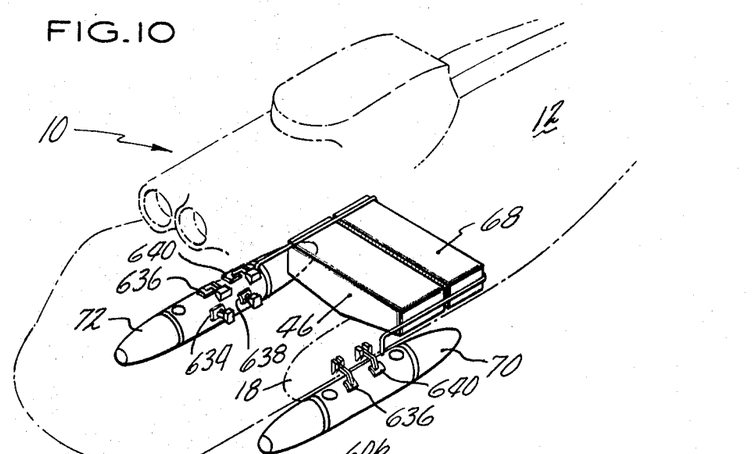
FIG. 10 is a showing of the auxiliary fuel tanks attached to the sponsons of the helicopter.

Our experience has shown that the ratio of the diameter of outlet 407 to the diameter of inlet 405 of conduit 404 should be no less than 2.5 to 1 for an operation in which fuel enters tank 72 at from 0 to 150 gallons per minute. In addition, due to the fluid flow resistance caused thereby, it would be undesirable to have the diameter of conduit 404 less than ¼" in any aircraft fuel system. Referring to FIG. 8 we see the manner in which the auxiliary fuel tanks 70 and 72 are mounted. While port tank 70 only is shown, it will be understood that the starboard tank 72 is mounted in the same fashion. Fuel tank 70 is mounted from sponson 18 or more particularly from pylon 19 extending laterally outwardly from sponson 18 by means of shackle 600 which is pivotally connected by pins such as 602 to apertured lugs 604 and 606 projecting from sponson 18. Shackle 600, which is basically hollow, carries therein an actuating system, best shown in FIG. 9, for disengaging pins 608 and 610, which project in pivot fashion through apertured lugs 612 and 614 projecting from auxiliary fuel tank 70. Pivotal sway braces 620, 622, 624 and 626 are pivotally attached to sponson 18 by pivot pin lugs such as 630 and 632 and include pad members such as 634, 636, 638 and 640 which engage the outer periphery of auxiliary fuel tank 70. In this fashion, with shackle 600 pivotally connected to the sponson and to the auxiliary fuel tank 70, and with the sway braces 620 through 626 bearing against the auxiliary tank, the auxiliary tank is held in place but in jettisonable fashion from the helicopter sponson 18. The jettison action will now be described.

Referring to FIG. 9 we see the jettison linkage 690 in enlarged form and extending outside of shackle 600 for purposes of illustration but linkage 690 is preferably all housed within shackle 600. The linkage includes pivot links 650 and 652, which are pivotally mounted at fixed pivot points 649 and 651 and which are pivotally connected at one end thereof to pins 608 and 610 at 654 and 656 and are pivotally connected at their other ends at 658 and 660 to cross rods 662 and 664. Cross rods 662 and 664 are pivotally connected to crank members 666 and 668, which are pivotally connected at points 670 and 672 and which are joined by mating ring gears or gear segments 674 and 676 to cause crank pivot motion about these pivot points in unison. One of the cranks such as 668, is pivotally connected at 678 to actuator arm 680. Actuator arm 680 may be caused to move leftwardly either by pilot actuated lanyard attachment 682 or by piston-cylinder hydraulic or pneumatic mechanism 684. When connector link 680 is caused to move leftwardly as shown in FIG. 9 by either pilot actuated lanyard connection 682 or piston-cylinder mechanism 684, crank 668 pivots in a counterclockwise direction to cause pivot link 652 to rotate or pivot in a clockwise direction so as to withdraw connecting pin 610 from auxiliary tank projection 614. At the same time, due to the coaction between ring gears 674 and 676, crank 666 moves in a clockwise direction to move pivot lever 650 in a counterclockwise direction so as to withdraw connecting pin 608 from pivot lug 612 projecting from the auxiliary tank 70. With both of these lugs removed, the tank 70 will thereby be jettisoned from the aircraft in flight since the sway braces 620 through 626 perform no tank retaining function. It will be evident that with this type of retension system, the auxiliary tanks can be supported from any surface, whether vertical, horizontal or therebetween.

The overall fuel system illustrated in FIG. 2 hereof is being claimed in patent application Ser. No. 628,108 filed Apr. 3, 1967, and now Patent No. 3,432,121 in the name of Everett W. Delaney and entitled "Aircraft Fuel Storage and Distribution System." The in-flight probe 30 and its actuating system illustrated in FIGS. 3 and 4 hereof are being claimed in patent application Ser. No.

628,109 filed Apr. 3, 1967, and now Patent No. 3,421,717 in the name of Joseph DiPiro and entitled "In-Flight Pressure Refueling Probe and Actuation System."

I claim:

1. A fuel tank shut-off valve actuation system adapted to shut-off fuel flow to a full tank automatically or to give a full tank signal so that the operator may shut-off fuel flow manually including:
   (1) a housing defining a chamber adapted to be connected to the interior of a fuel tank,
   (2) first conduit means extending from said housing and adapted to connect said chamber to the interior of the fuel tank,
   (3) second conduit means extending from another portion of said housing and communicating with atmosphere and said chamber for chamber venting purposes,
   (4) a fuel inlet conduit adapted to have fuel passed therethrough into the fuel tank,
   (5) a bypass sampling conduit having an inlet end and an outlet end extending through said housing to communicate with said chamber, said bypass sampling conduit being of minimum cross-sectional area at the inlet thereto adjacent said first conduit and being of enlarged cross-sectional area between the inlet and the outlet thereof and having a smooth walled portion smoothly joining said minimum area and said enlarged area regions to establish a reduced velocity, laminar fluid region in said bypass line,
   (6) means to establish a pressure drop across said bypass sampling line to induce fluid flow therethrough when tank discharge air passes through said chamber and when initial fuel overflow pases into said chamber,
   (7) a thermistor member positioned in said bypass sampling line in the vicinity of said enlarged area region to be responsive to temperature variation in said bypass line.

2. Apparatus according to claim 1 wherein said bypass line forms an angle with the horizontal to form a drainage area therein so that any liquid deposited therein will drain therefrom and wherein said thermistors are located out of said drainage area and so as to be gravity drained of any fluid thereon.

3. Apparatus according to claim 2 wherein the cross-sectional area of said second conduit is greater than the cross-sectional area of said first conduit.

4. Apparatus according to claim 3 wherein the internal diameters in said bypass line are selected so that the Reynolds number with respect to the fluid passing therethrough is about 2000 or less according to the formula:

$$R_e = \frac{VD\rho}{\mu}$$

where:

$R_e$ = Reynolds number
$V$ = velocity of the fluid
$\rho$ = density of the fluid
$\mu$ = absolute viscosity of the fluid
$D$ = diameter of the line.

5. Apparatus according to claim 1 wherein said pressure drop creating means includes nozzle-like aperture means associated with said first conduit.

6. Apparatus according to claim 1 wherein said pressure drop creating means includes a by-pass line having an outlet end larger than the inlet end.

7. A liquid tank valve system including:
   (1) a housing defining a hollow chamber therewithin,
   (2) first conduit means extending from said housing and communicating with said hollow chamber and adapted to communicate with the interior of the liquid tank to be filled,
   (3) a second conduit extending from said housing and communicating with said hollow chamber so that air will be forced through said first conduit, said hollow chamber and said second conduit when the tank on which said shut-off valve is adapted to be mounted is being filled with liquid and through which the initial overflow of the liquid will flow when the tank is filled,
   (4) a bypass sampling conduit communicating with said hollow chamber to sample the tank discharge fluid being passed through said hollow chamber and shaped to define a low velocity, non-turbulent flow region therewithin,
   (5) and a temperature sensitive thermistor mechanisms communicating with said low velocity, non-turbulent flow region of said bypass sampling line and adapted to give a signal when the initial overflow liquid from the tank contacts said thermistor mechanisms.

8. A liquid tank valve system including:
   (1) a housing defining a hollow chamber therewithin,
   (2) first conduit means extending from said housing and communicating with said hollow chamber and adapted to communicate with the interior of the liquid tank to be filled,
   (3) a second conduit of greater cross-sectional area than said first conduit extending from said housing and communicating with said hollow chamber so that air will be forced through said first conduit, said hollow chamber and said second conduit when the tank is being filled with liquid and through which the initial overflow of the liquid will flow when the tank is filled,
   (4) a bypass sampling line projecting from said housing and including both an inlet and an outlet communicating with said hollow chamber to sample the fluid being passed therethrough, said bypass sampling line having an inner surface shaped to define a flow volume of minimum cross-sectional area adjacent inlet of said bypass sampling line and of enlarged cross-sectional area between the inlet and the outlet of said bypass sampling line so as to define a plenum chamber therewithin shaped to establish a reduced velocity, laminar flow region at said enlarged area station,
   (5) means to establish a pressure drop across the inlet and outlet of said bypass line so as to create fluid flow through said bypass sampling line when tank air is discharged through said hollow chamber when the liquid tank is being filled and when initial liquid overflow passes into said chamber,
   (6) and temperature sensitive thermistor means located in said bypass line at said enlarged area station and adapted to give a signal when initial overflow liquid first contacts said thermistor means.

9. Apparatus according to claim 8 wherein said bypass sampling line is canted with respect to the horizontal so that liquid deposited therein will drain therefrom by gravity.

10. Apparatus according to the preceding claim wherein said thermistors are located in said low-velocity, non-turbulent flow region away from the gravity drainage area.

11. Apparatus according to claim 10 wherein the cross-sectional areas of said first and second conduits are such that the pressure drop across said hollow chamber is greater than the pressure drop between said inlet and said outlet of said bypass line.

12. Apparatus according to claim 8 wherein said thermistors are located in the vertical top of said plenum chamber.

13. A shut-off valve system adapted to be used in connection with the filling of a liquid tank and including:
   (1) a liquid inlet line adapted to communicate with the interior of the tank to be filled,
   (2) an air exhaust line adapted to be connected to the interior of the liquid tank being filled and through which the tank air will be expelled during liquid refueling operation, (3) a bypass sampling line having an inlet and an outlet connected to and communicating with the interior of said air exhaust line, (4) said bypass sampling line having wall members defining a fluid flow path of minimum cross-sectional area at said bypass sampling line inlet and of enlarged cross-sectional area between said bypass sampling line inlet and outlet and being smoothly joined to define a reduced velocity, laminar flow region at said enlarged area station, (5) and temperature sensitive thermistor means positioned in said bypass sampling line at said enlarged area station and adapted to give a signal when initial liquid tank overflow contacts the thermistor means.

14. Apparatus according to claim 13 wherein said bypass line forms an angle with the horizontal so that any liquid deposited therein will gravity drain therefrom to form a drain region therewithin, and wherein said thermistor is positioned out of said drain region and above the vertical bottom of the bypass line so that the thermistor surface is gravity drained.

15. Apparatus according to the preceding claim wherein said diameters in said bypass line are chosen with respect to the type of liquid being used to fill the tank so that the Reynolds number established thereby is less than about 2000 according to the formula.

$$R_e = \frac{VD\rho}{\mu}$$

where:

$R_e$ = Reynolds number
$V$ = velocity of the fluid
$\rho$ = density of the fluid
$D$ = diameter of the conduit
$\mu$ = absolute viscosity of the fluid.

16. Apparatus acording to claim 13 wherein the diameter of said outlet of said bypass sampling line is at least 2.5 times the diameter of said inlet of said bypass sampling line.

17. A tankful system adapted for use with a liquid tank which is to be rapidly filled with liquid and which is to have liquid transferred therefrom by tank pressurization including:

(1) a tank vent and pressurization conduit adapted to be connected to the tank interior so that tank air will be discharged therethrough during tank filling operation and so that pressurized air will be introduced into the tank interior therethrough during transfer of the tank liquid from the tank, (2) a bypass sampling line communicating with said conduit to sample the fluid being passed through said conduit and shaped to define an enlarged cross-sectional area plenum chamber between the inlet and outlet of said line and which plenum chamber is of greater cross-sectional area than the cross-sectional area of said inlet of said line so that a low velocity, nonturbulent flow region is established in said plenum chamber, (3) and a temperature sensitive thermistor communicating with said plenum chamber and adapted to produce a signal when the sampled fluid being passed therethrough during tank filling operation changes from air to liquid indicating a tank-full condition.

18. Apparatus according to claim 17 wherein said plenum chamber is defined by the inner walls of the bypass sampling line so as to be divergent at the region closest to the bypass sampling line inlet, convergent at the region nearest to the bypass sampling line outlet and having a smooth-walled connecting section therebetween.

19. Apparatus according to claim 17 and wherein said plenum chamber is contoured so that the Reynolds number established therein is less than about 2000 according to the formula:

$$R_e = \frac{VD\rho}{\mu}$$

where:

$R_e$ = Reynolds number
$V$ = velocity of the fluid
$\rho$ = density of the fluid
$D$ = diameter of the conduit
$\mu$ = absolute viscosity of the fluid.

20. Apparatus according to claim 17 wherein the ratio of the cross-sectional area of the outlet of the bypass sampling line to the inlet of the bypass sampling line is about 2.5 to 1.

21. Apparatus according to claim 20 wherein the diameter of the inlet of the bypass sampling line is a minimum of one-quarter inch.

22. Apparatus according to claim 17 wherein the bypass sampling line is positioned at an angle to the vertical and wherein the thermistor is located toward the vertical top of the plenum chamber so that liquid deposited in the plenum chamber or on the thermistor will be gravity drained therefrom.

23. Apparatus according to claim 17 and including means to establish a pressure drop across said bypass sampling line.

24. An electrical sensing unit for fluid handling apparatus including:

(1) a housing defining a hollow chamber therewithin, (2) first conduit means extending from said housing and communicating with said hollow chamber and adapted to communicate with the interior of the fluid handling apparatus to be filled, (3) a second conduit of equal or greater cross-sectional area than said first conduit extending from said housing and communicating with said hollow chamber, (4) a by-pass sampling line communicating with said hollow chamber and shaped to define a plenum chamber between the inlet and outlet of said line, (5) said by-pass line inlet being located in close proximity to said first conduit means, (6) means to establish a pressure drop across said sampling line to induce fluid flow therethrough, (7) a thermistor member positioned in said plenum chamber of said by-pass line, and (8) and means responsive to thermistor reaction to produce a signal.

References Cited

UNITED STATES PATENTS

| | | | |
|---|---|---|---|
| 2,869,368 | 1/1959 | Brown | 73—304 |
| 2,884,948 | 5/1959 | Weiss | 137—392 X |
| 3,181,557 | 5/1965 | Lannan | 137—392 X |

WILLIAM F. O'DEA, Primary Examiner

D. R. MATTHEWS, Assistant Examiner

U.S. Cl. X.R.

244—17.11, 135